April 8, 1969           D. D. EDEN           3,437,399

SOLID-STATE CRYSTAL OPTICAL MODULATOR

Filed May 28, 1964

INVENTOR
Dayton D. Eden

BY Thomas A. Harwood

ATTORNEY

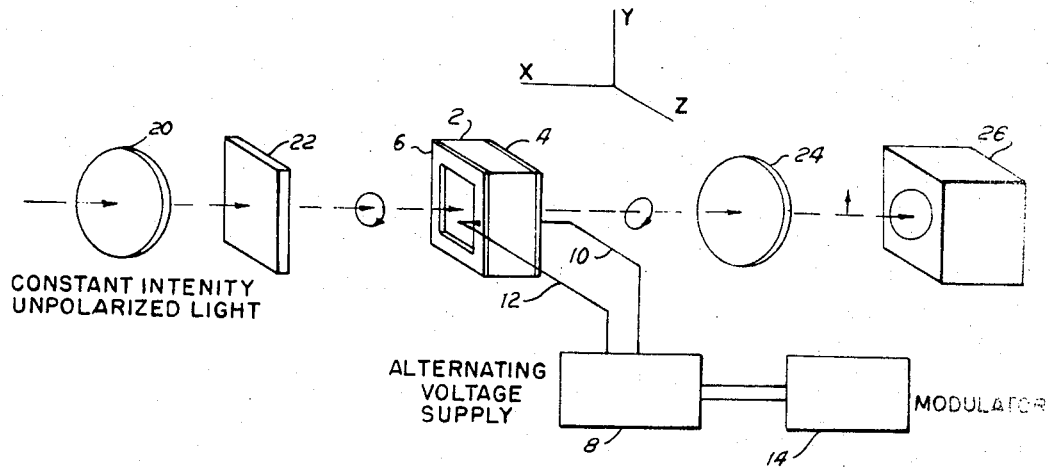
Fig. 3
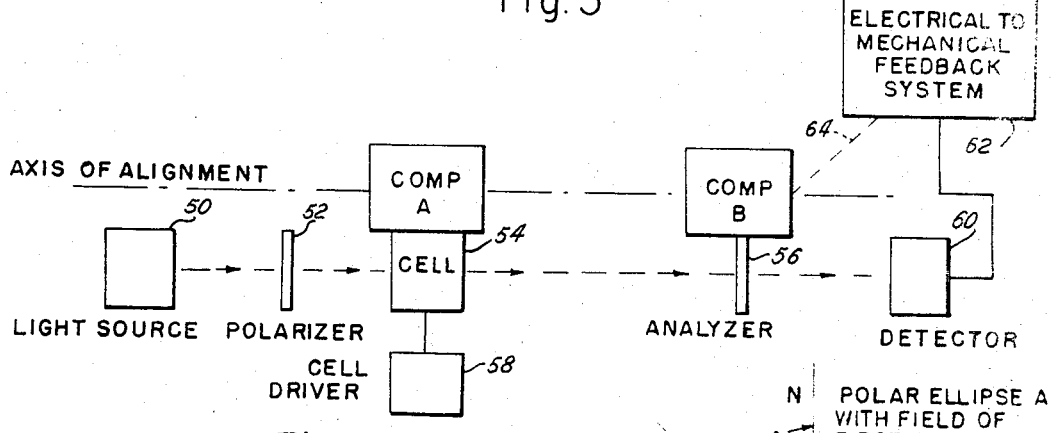
Fig. 6
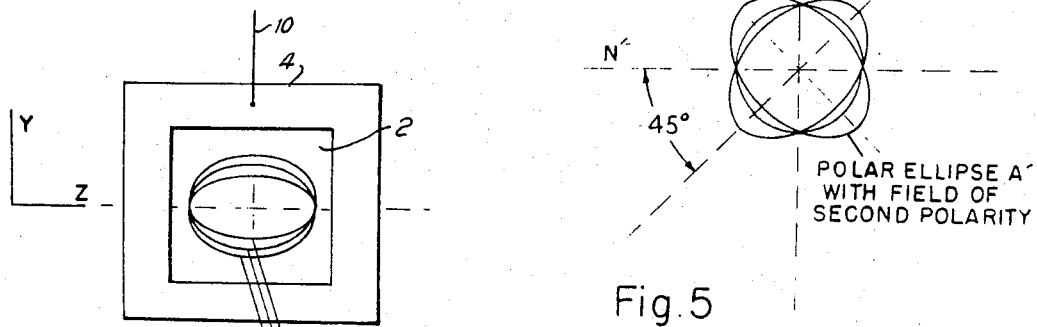
Fig. 5
Fig. 4

United States Patent Office 3,437,399
Patented Apr. 8, 1969

3,437,399
SOLID-STATE CRYSTAL OPTICAL MODULATOR
Dayton D. Eden, Dallas, Tex., assignor to Texas Instruments Incorporated, Dallas, Tex., a corporation of Delaware
Filed May 28, 1964, Ser. No. 371,071
Int. Cl. G02f 1/24, 1/26, 1/28
U.S. Cl. 350—149                                      10 Claims

ABSTRACT OF THE DISCLOSURE

Disclosed herein is an optical modulator of piezoelectric material (such as quartz) having a pair of opposing faces disposed substantially parallel to the z-axis of the crystal and means for establishing an alternating electric field within the crystal substantially perpendicular to the z-axis. A substantial improvement in the light modulation obtainable results from the combined use of the Pockel's effect as well as the acoustic resonance effect present by operating the alternating electric field at a frequency substantially equal to the natural piezoelectric resonance frequency of the crystal.

---

This invention relates to optical modulation and more particularly to the phase modulation between the linear components of a polarized light beam to effect intensity modulation thereof.

There are many applications where the intensity modulation of a light beam is required or desirable, with the communications field being one area of interest. Although both frequency and amplitude modulation of an alternating electric signal has been advanced for many years, there are instances where it is desirable to utilize an optical beam rather than an electrical signal either as an alternate thereto or where it is impractical to use an electrical signal. In the communications field, for example, a secret means of communication can be provided by transmitting a light beam from one location to another, assuming that the desired information can be impressed upon the light beam. This requires modulation of the light beam intensity. In other areas, optical shutters are required, in which case, modulation of a light beam is again a necessity. Another specific example of the use of an intensity modulated light beam is disclosed in the copending application of John L. Snyder III entitled, Optical Instrument for Determining the Parallelism or Non-Parallelism of Two Reflecting Surfaces, Ser. No. 349,454, filed Mar. 4, 1964, and assigned to the common assignee, wherein there is described a polarimeter system for measuring the parallelism between two spaced apart reflecting surfaces. The modulated light beam is utilized in what is known as a "twist" system for maintaining alignment between two 90° prism systems. As will become readily apparent, there are many other applications where the efficient modulation of a light beam is desirable.

Although a light beam may be modulated in intensity in various ways, the most successful technique yet devised is by passing a polarized light beam through a solid-state crystal, which is normally birefringent, and utilizing the Pockel's effect to produce the necessary modulation. The light beam in such case is elliptically, circularly or linearly polarized, whereby the polarized light can be schematically represented by two perpendicular amplitude vectors whose magnitudes vary sinusoidally at a given phase angle to each other. By creating an electric field within the crystal in which the optic beam traverses, the crystal's birefringence may be altered to cause a differential change in the velocity of the two perpendicular vectors. Consequently, the phase between the two perpendicular components is altered to effect a phase modulation depending upon the electric field strength, length of the crystal traversed by the light beam, the particular crystal used and other factors. By using an analyzer, such as a linear polarizer plate, the light beam is amplitude modulated when it passes therethrough. All of this is well known, including the Pockel's effect to produce the necessary phase modulation.

The amount of modulation that can be achieved by passing a light beam through a Pockel's cell of the conventional type is expressed by the relation (1) $$\Delta\phi = 2\pi l N_o{}^3 r_{ij} E / \lambda_o$$

where $\Delta\phi$ is a quantitative measure of the change of phase between the two perpendicular components of a polarized light beam traversing the crystal, $l$ is the length of the crystal traversed by the light beam, $r_{ij}$ is the Pockel's coefficient, E is the electric field established within the crystals, $N_o$ in the ordinary index of refraction of the crystal and $\lambda_o$ is the free space wavelength of the light used. The above relation usually applies for substantially monochromatic light, and it can be seen that the degree of modulation of the light is dependent upon the length of the crystal traversed by the light, and is directly proportional to the magnitudes of the Pockel's coefficient and the electric field established within the crystal.

There are several materials which exhibit the Pockel's effect in the presence of an electric field, such as quartz $(SiO_2)$, potassium - dihydrogen - phosphate or KDP $(KH_2PO_4)$, cuprous-chloride (CuCl) and hexamethylenetetramine (HMTA), as examples. Here, quartz has a hexagonal crystal structure, KDP has a tetragonal structure, CuCl is cubic as is HMTA. Actually, there are many crystal classes which exhibit a Pockel's effect in the presence of an electric field, and in general, these are all crystals which also exhibit piezoelectric properties as will be explained more fully later. However, the magnitude of the Pockel's coefficient exhibited by these crystals is small, and to achieve any considerable degree of phase modulation of a light beam, a very large voltage is required to establish the necessary electric field within the crystal. For example, in most crystals which exhibit the Pockel's effect, it is necessary to apply a voltage in the order of several kilovolts across the crystal to create the necessary electric field to achieve a relative phase change between the two perpendicular components of a polarized light beam of 90° during its traversal of the entire crystal length. This is an impractically large voltage for many applications.

To overcome these problems and greatly increase the efficiency of phase modulation, the present invention utilizes the Pockel's effect in conjunction with a piezoelectric resonance effect. The latter is established by creating an alternating electric field within a crystal which exhibits a piezoelectric effect (and also the Pockel's effect), and by using the proper frequency of the electric field to establish acoustical resonance within the crystal, the Pockel's coefficient is observed to be increased by several orders of magnitude. According to Equation 1 above, this results in a proportional increase in the phase modulation of the polarized light beam. By using the resonant frequency it also becomes apparent from Equation 1 above that very small voltages can be used to produce almost any desired modulation of a light beam.

Although any material may be used in the invention which exhibits both the Pockel's effect and the piezoelectric effect, quartz has been found to exhibit the greatest increase in Pockel's coefficient at the acoustic resonant frequency as compared to other piezoelectric materials, and is thus the preferred crystal material. The fact that quartz exhibits this effect much more predominantly than any other material is, in itself, a very considerable advantage. Quartz is an extremely stable material whose structural and crystal characteristics vary by a minimum amount as a function of temperature and other parameters. Quartz is also the most desirable optical material to use since it is transparent to virtually all wavelengths of light. As will be seen hereinafter, a suitable modulator geometry may be chosen wherein very little difference in the amount or character of phase modulation of a polarized light beam is produced as a function of the direction which the light beam traverses the crystal within a large range of angles, and consequently, the quartz crystal modulator of the invention has a wide angular field of view. Moreover, quartz technology is quite advanced, technically, and thus crystals of almost any size, shape and orientation are readily available. For instance, a quartz crystal having an extremely high Q value may be readily purchased for particular applications of the invention to be noted hereinafter.

Other objects, features and advantages will become apparent from the following detailed description when taken in conjunction with the appended claims and the attached drawing wherein like reference numerals refer to like parts throughout the several figures, and in which:

FIGURE 3 is a pictorial illustration of the Pockel's cell shown in FIGURE 1 used in conjunction with other apparatus to provide an optical modulator system, which system can be used as a light shutter, communications system or used in various other applications;

FIGURE 4 is an elevational view of one face of the Pockel's cell shown in FIGURE 1 schematically illustrating the birefringence of the crystal;

Figure 1:
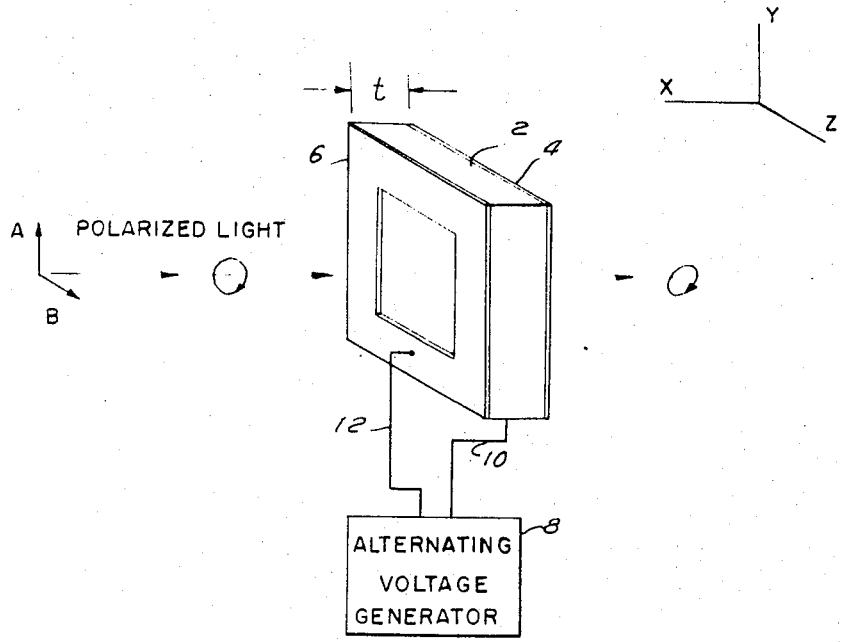
FIGURE 1 shows, in perspective view, a piezoelectric crystal in which the Pockel's effect is exhibited when an electric field is established therein and which produces phase modulation of a polarized light beam passing therethrough.

FIGURE 5 is a schematic illustration of the polarization characteristics of a light beam after passing through the cell of FIGURE 1; and FIGURE 6 shows one application of the modulator of the invention Since the optical modulator of the invention utilizes both the Pockel's effect and an acoustic resonance effect, a brief discussion of both, including some theoretical analysis, will help in an understanding of the invention. The Pockel's effect is observed in a single crystal of material when an electric field is created therein and polarized light is passed through the crystal. In the absence of an electric field, the crystal normally is selected as being birefringent, and the character of the polarized light passing through the crystal is altered to some degree, whereby the phase relation between the perpendicular components into which the polarized beam can be resolved has been changed. The application of a voltage across the crystal to establish an electric field therein causes changes in the birefringence of the crystal, usually increasing this characteristic, which also increases the amount or degree of phase alteration between the two perpendicular components. Cubic crystals are different in that they exhibit no birefringence in the absence of an electric field and become birefringent in the presence thereof. Thus, in the presence of the field, the two perpendicular components of a polarized light beam travel through the crystal at different relative speeds than they otherwise would to the relative phase relationship therebetween. In such case, the nature of the polarization of the light beam emerging from the crystal is altered from that which enters the crystal. As stated earlier, very little modulation or change of this phase relation can be effected in conventional Pockel's cells, which is primarily attributable to the small Pockel's coefficient of the crystals used.

The present invention also utilizes the Pockel's effect but creates an acoustic resonance effect within a piezoelectric crystal to increase the Pockel's coefficient by many orders of magnitude. When an electric field is established within a piezoelectric crystal, an acoustic wave is generated whose wavelength is controlled by the frequency of the electric field and whose frequency is the same as the electric field. Referring specifically to FIGURE 1, there is shown a single crystal 2 of a material, preferably quartz, which exhibits both the Pockel's effect and the piezoelectric effect, with electrodes 4 and 6 attached to opposite faces thereof and defining openings to permit the passage of light through the crystal. Here, the crystal is cut with its $x$, $y$ and $z$-axes as shown, which axes designations are well known in the art. An alternating voltage generator 8 is connected to the two electrodes by means of leads 10 and 12 and establishes an electric field within the crystal between the electrodes parallel to the $x$-axis thereof. Polarized light is passed through the crystal along the $x$-axis parallel to the electric field, wherein the light beam is preferably monochromatic and circularly polarized, the latter being preferred for reasons noted later. The Pockel's effect is observed in this configuration with the electric field and light beam preferably being parallel to the $x$-axis and perpendicular to both the $y$ and $z$-axes. Actually, the Pockel's effect can be observed with the electric field along any axis except the $z$-axis, which is the optic axis of the crystal, although the effect is not as great. Moreover, the light beam may traverse the crystal along any axis with the effect being observed, although again, the effect is not as great as the configuration shown in FIGURE 1. Because of the piezoelectric nature of the crystal, an acoustic wave is generated within the crystal in response to the electric field, which travels back and forth between the faces thereof to which the electrodes are attached. By adjusting the frequency of the alternating voltage to the natural acoustic resonance frequence $f_0$ of the crystal, a very large increase in the Pockel's coefficient is observed. This resonance can be shown to be governed by the relation (2) $$f_0 = v_s/2t$$

where $v_s$ is the velocity of the acoustic wave within the crystal, $t$ is the thickness of the crystal traversed by the acoustic wave as shown in FIGURE 1 and $f_0$ is the acoustic resonance frequency. This is the fundamental mode of the piezoelectric crystal, and as Equation 2 states, is the condition where the acoustic wavelength is twice the length of the crystal traversed thereby. The Pockel's effect occurs within the crystal as a result of the interaction of the electric field and the crystalline structure to alter the indices of refraction of light traveling through the crystal in difference directions.

It is observed in crystals which exhibit the Pockel's effect that the Pockel's coefficient remains substantially constant for a wide frequency range of the applied electric field. However, it has been observed in the present invention that upon the application of an alternating electric field at the natural acoustic resonance frequency of the crystal, a very large increase in the Pockel's coefficient results. This is due to the fact that when an electric field is applied to a piezoelectric crystal, the crystal is actually deformed or strained, whereby its length is increased and decreased according to the electric field. At the acoustic resonance frequency, the crystal is strained by a maximum amount because of the natural resonance mode of vibration of the acoustic wave therein. Since the extent of birefringence of the crystal is strongly governed by the amount by which the crystal is strained, and since the birefringence determines the degree of phase modulation of a polarized light beam traversing the crystal, it can thus be seen that a very large increase in the modulation of a light beam results by establishing a resonance condition within the crystal. This is illustrated graphically in FIGURE 2, where it can be seen that the Pocket's coefficient is comprised substantially constant as a function of frequency of the applied electric field until the resonance frequency $f_0$ is attained, at which point a very large increase in the strain, and thus modulation of the light beam is observed. Further increases of the frequency cause the response to decrease below its original value and remain constant for higher frequencies. From this graphical illustration, it can be seen that the Pocket's coefficient is comprised of three components, one which is constant and is observed for frequencies below the resonance frequency $f_0$, another component which is observed at the resonant frequency with a bandwidth $\Delta f$, and a third component which is observed at higher frequencies. Thus the increase in the strain of the crystal at the natural acoustic resonance frequency is equivalent to an increase in the Pockel's coefficient. To give some representative values of the magnitudes of the Pockel's coefficients, crystals using only the Pockel's effect exhibit coefficients ranging from about $10^{-10}$ centimeter/volt to about $10^{-9}$ cm./volt. Quartz exhibits a coefficient of about $10^{-10}$ cm./volt for frequencies below the resonance frequency $f_0$, but at the resonance frequency exhibits a coefficient which can be as high as $10^{-3}$ cm./volt. The coefficient at this frequency depends upon the Q of the crystal which is defined as the ratio $f_0/\Delta f$, where $\Delta f$ is the frequency width at half the magnitude of the peak of the curve shown in FIGURE 2. As noted earlier, the Q value of quartz may be made very large, which indicates that a quartz crystal has an extemely well defined natural resonance frequency. For applications of the invention to commnuications systems, however, it may be desirable to utilize a quartz crystal having a lower Q value (greater $\Delta f$) in order to realize a larger bandwidth for modulation purposes. A more realistic value for the Pockel's coefficient in such case is about $10^{-6}$ cm./volt or even less.

As is well known, polarized light can be revolved into two perpendicular vectors (which are schematic representations of the vibrating electric or magnetic fields associated therewith) whose magnitudes vary sinusoidally with a particular phase relation therebetween depending upon the character of the polarized light. This is equivalent to saying that circularly, elliptically or linearly polarized light can be resolved into two perpendicular linearly polarized beams of a given phase relation therebetween. In FIGURE 1, the circularly polarized beam is shown schematically to be resolved into two vectors A and B, with vector A being parallel to the y-axis of the crystal, and vector B being parallel to the z-axis and both traversing the crystal along the x-axis. For the crystal shown in FIGURE 1, the amount of phase change between the components A and B of the polarized light beam is governed by Equation 1 above. Since, however, the electric field is applied along the x-axis over a distance $t$ and is equal to the ratio $V/t$, where $t$ is equal to the length $l$ which the light traverses, Equation (1) becomes (3) $\qquad \Delta\phi = 2\pi N_0^3 r_{ij} V / \lambda_0$ where V is the voltage applied between the electrodes 4 and 6. The subscripts $i$ and $j$ of the Pockel's coefficient refer, respectively to the electric field direction and the direction of stress in the crystal. Thus the Pockel's coefficient can be denoted $r_{xz}$, since the stress is created parallel to the z-axis.

From the foregoing it is seen how the Pockel's coefficient is greatly increased in the invention, and the following discussion relates to the modulation of a polarized light beam by a Pockel's cell. Referring to FIGURE 3, unpolarized light of constant intensity is directed onto a linear polarizer 20 and then onto a quarter-wave plate 22 to produce circularly polarized light impinging on the crystal cell 2. Circularly polarized light is preferred as will be shown later, although linear or elliptically polarized light can also be used. Moreover, any suitable light source can be used which emits a beam of polarized light which is substantially monochromatic. The latter is prepared in order to preserve more easily the identity of the particular wavelength of light being modulated. As shown in FIGURE 1, the cell comprises a crystal 2 having electrodes 4 and 6 attached to opposite faces thereof and is situated in the optical path of the circularly polarized light, wherein the crystal and its associated electrodes will be referred to hereinafter as a Pockel's cell. An alternating voltage supply 8 is connected to the electrodes by means of leads 10 and 12, respectively, for applying an alternating electric field between the electrodes, wherein the function of the Pockel's cell in conjunction with the alternating voltage supply is to alter the polarization characteristics of the light that passes therethrough.

Under the influence of the applied field, the substance 2 becomes birefringent, and polarized light traversing the crystal in the presence of a field undergoes a change in the nature of its polarization. This change can be explained by considering the light to be composed of two mutually perpendicular linear polarized waves each vibrating perpendicular to the direction of propagation with the phase between the two linear vectors depending upon the exact polarization of the light, all which is known. That is to say, polarized light, whether it be linear, circular or elliptical, can be resolved into two mutually perpendicular linear components. When the polarized light traverses a crystal of this type in the absence of an electric field, it leaves the substance with a change in its polarization characteristics if it is other than a cubic crystal. The amount of polarization change is altered in the presence of the field. For cubic crystals which are not birefringent in the absence of a field, the polarization characteristics are altered only in the presence of the field. This change in phase is a function of the magnitude and polarity of the applied field and is due to the fact that the index of refraction is different for each component, which is a result of the substance itself having different indices of refraction for light traversing the substance in different directions in the presence of the field. Therefore, one linear component of the light becomes retarded with respect to the other as they travel the length of the substance. If the polarized light traverses the optical substance in the presence of an alternating field, the emergent light at any point along the path will undergo continuously changing states of polarization.

FIGURE 4 is a front view of the Pockel's cell of FIGURE 3 with the direction of propagation of the light being out of the plane of the drawing parallel to the x-axis, and illustrates schematically the Pockel's effect. Here, the crystal 2 is preferably cut so that the electric field created by the application of a voltage between the electrodes 4 and 6 is parallel to the direction of propagation of the light and the x-axis of the crystal. With no electric field applied, the circularly polarized light, or any other type of light for that matter, will traverse the quartz crystal with a change in its nature of polarization as indicated by the index ellipse $Z_1$, which denotes that the extraordinary index of refraction along the z-axis (corresponding to the major axis of the ellipse) is greater than the ordinary index of refraction along the y-axis (corresponding to the minor axis of the ellipse). However, when an electric field is created between electrodes 4 and 6 of one polarity, the index of refraction for linear components of light parallel to the y-axis is increased, but remains the same, for quartz, for linear components parallel to the z-axis and is illustrated as such by index ellipse $Z_2$. When an electric field is created between the electrodes 4 and 6 of the opposite polarity, the y-axis index of refraction (ordinary) is decreased below its value in the absence of a field and the z-axis index again remains the same, and is illustrated as such by index ellipse $Z_3$. When circularly polarized light traverses the crystal in the presence of an electric field applied between the two electrodes, its polarization will be changed from circular to some form of elliptical, where the polarization ellipse of the emergent light will be at 45° to the index ellipses as illustrated in FIGURE 5 as either ellipse A or A', the particular ellipse in FIGURE 5 depending upon the polarity of the applied field. If the field is alternating, the polarization of the light emerging from the cell will go from one polarization ellipse (indicated as field of first polarity) to the other polarization ellipse (indicated as field of second polarity) and back again over one complete cycle of the electric field, with the polarization ellipse becoming the special case of a circle somewhere in between as shown. It should be noted that the ellipses in FIGURE 4 represent schematically the indices of refraction of the crystal 2 comprising the cell, whereas the ellipses of FIGURE 5 represent schematically the polarization characteristics of the light beam, and the two should not be confused.

Referring again to FIGURE 3, the presence of an electric field in the crystal produces a resultant emergent beam of light which represents a phase modulation between the linear components into which the incident polarized light beam is resolved. In order to utilize this in practical applications, the phase modulation ordinarily has to be converted into an intensity modulation, and to do this, an analyzer 24 is placed in the path of the beam to convert the phase modulation to an intensity modulation, wherein the analyzer is simply another linear polarizer. Referring again to FIGURE 5, if the axis of the analyzer is aligned with either axis N or N', which are coincident with the $y$ and $z$-axes, respectively, of the crystal, the intensity of the light emerging from the analyzer and striking a detector 36 will be constant and not vary as a function of the alternating electric field on the Pockel's cell. This is apparent since the axes N and N' pass through the common points of both polarization ellipses and the polarization circle of FIGURE 5. Positioning the analyzer between the $y$ and $z$-axes of the crystal, however, yields a light beam striking the detector whose intensity varies sinusoidally, where the maximum amplitude occurs with the analyzer axis at 45° to both of these axes. When the analyzer axis is parallel with neither the $y$ nor $z$-axes of the crystal, an A.C. signal is generated at the detector output, the magnitude of which is dependent on the degree of misalignment, with the amplitude of the detector output becoming greatest at 45° and less as the analyzer axis approaches a parallell relationship with either the $y$ or $z$-axis. It can be seen that if the analyzer is rotated relative to the cell in one direction about the $x$-axis, the alternating signal at the detector output has one phase, and if rotated in the opposite direction, the alternating signal has the opposite phase (180° from the former). Thus it also becomes apparent that the amplitude of the alternating detector signal is an indication of the degree of misalignment of the analyzer and the cell, whereas the phase of the alternating detector signal is an indication of the direction of misalignment. This is one manner in which the light beam emerging from the analyzer can be intensity modulated, which is effected by the relative rotation of the analyzer and cell. This type of modulation is used in the particular application to be described below in conjunction with FIGURE 6.

Assuming that the axes of the analyzer and cell are maintained at a constant angle with respect to each other (but not parallel), a constant amplitude alternating signal will be produced at the detector output. By amplitude modulating the alternating voltage applied to the cell, such as by means of any suitable modulator 14 shown in dashed lines of FIGURE 3, the amplitude of the detector output will also be modulated. Since the cell exhibits a very large Pockel's coefficient when the frequency of the alternating voltage is at the natural resonance frequency of the crystal, the polarization characteristics of the light striking the analyzer can be drastically altered as compared to the original incident beam, and thus the intensity of the light emerging from the analyzer can also be changed over a very large range. Such modulation finds great utility in communications systems, for example, whereby the alternating voltage is amplitude modulated at an audio rate.

A specific application of the optical modulator of the invention is shown in the block diagram of FIGURE 6, which shows a system correction and alignment apparatus for maintaining alignment between two components of any equipment about an axis of alignment as shown. A light source 50 characterized by a constant intensity is directed on an optical Pockel's cell 54 through a polarizer 52, wherein the Pockel's cell is that of the invention just described. The light beam traverses the cell and emerges on the opposite side thereof where it is directed to impinge on an analyzer 56, which is a linear polarizer. An alternating voltage applied to the cell from a cell driver 58 causes a phase change in the two perpendicular components of the originally polarized beam emerging from the polarizer 52 which, in turn, causes the polarization characteristic of the beam emerging from the cell to vary. A suitable detector 60, such as a photomultiplier tube or a photovoltaic cell, as examples, is positioned behind the analyzer and registers the intensity of the light emerging from the analyzer and converts the signal or beam into an electrical signal proportional to the intensity thereof.

Figure 2:
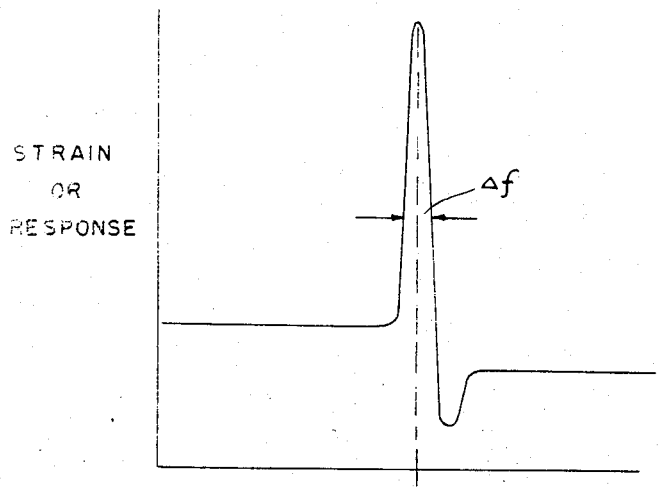
FIGURE 2 is a graphical representation of the relative amount of modulation or response of a Pockel's cell as a function of the frequency of an alternating electric field created within the crystal.

The function of the system of FIGURE 6 is the comparison of the alignment of the cell 54 and the analyzer 56 when each the cell and analyzer are attached to two components, respectively, of a piece of equipment, such as, for example, the two 90° prisms shown in FIGURE 2 of the above noted copending application. However, for purposes of the present discussion and the description of the comparison and correction apparatus, the pieces of equipment to which the cell and analyzer are respectively attached are referred to as components A and B. Further, it will be assumed that component A and cell 54 are stationary, whereas component B and the analyzer 56 are free to be rotated about the axis of alignment, as shown. The output of the detector 60 is connected to a suitable electrical to mechanical feedback system 62, such as that described in conjunction with FIGURES 2 and 11 of said copending application, which in turn is connected to component B and the analyzer by means of a mechanical linkage 64, for example. The feedback system moves the component B and analyzer about the alignment axis in response to the detector output to maintain an alignment between the cell and the analyzer about the alignment axis. When the cell and analyzer are properly aligned, the light beam striking the analyzer has a polarization such that the detector either does not produce an output signal or the signal produced is such that the electrical to mechanical feedback system does not respond to the signal. As the cell and analyzer become misaligned about the axis of alignment (which implies that components A and B are misaligned), the intensity of the light emerging from the analyzer and striking the detector changes, or is modulated, which causes a signal at the output of the detector to which the electrical to mechanical feedback system responds. The latter realigns the two components in response to this signal, which in turn, causes the signal to decrease. Because of the extreme sensitivity that can be attained in the optical modulator of the invention, components A and B of such a system just described can be maintained in very precise alignment.

Although the invention has been described with reference to a preferred embodimnt, including particular applications thereof, certain modifications and substitutions that do not depart from the true scope of the invention will become readily apparent to those skilled in the art, and it is intended that the invention be limited only as defined in the appended claims.

What is claimed is:
1. An optical modulator comprising:
 (a) a single crystal of piezoelectric material exhibiting optical birefringence as a function of an electric field created therein and having a pair of opposing faces disposed substantially parallel to the z-axis of said crystal,
 (b) means for establishing an alternating electric field within said crystal substantially perpendicular to said z-axis having a frequency substantially equal to the natural piezoelectric resonance frequency thereof, and
 (c) means for directing light parallel to the x-axis of said crystal and incident on one of said opposing faces,
  wherein said light is modulated upon traversing the crystal by the combined piezoelectric resonance effect and the electro-optic effect.

2. An optical modulator according to claim 1 wherein said z-axis defines an optic axis of said crystal.

3. An optical modulator according to claim 2 wherein said single crystal of material is quartz.

4. An optical modulator according to claim 1 wherein said last named means produces light which is substantially monochromatic and circularly polarized.

5. An optical modulator comprising:
 (a) a single crystal of piezoelectric material exhibiting optical birefringence as a function of an electric field created therein and having a pair of opposing faces disposed substantially parallel to the z-axis of said crystal,
 (b) a pair of electrodes attached to said pair of faces, respectively, and defining apertures therein exposing portions of said faces for the passage of light therethrough, and
 (c) electrical supply means connected to said pair of electrodes for establishing an alternating electric field in said crystal substantially prependicular to said z-axis having a frequency substantially equal to the natural piezoelectric resonance frequency thereof.

6. An optical modulator according to claim 5 wherein said single crystal of material is quartz and said z-axis defines the optic axis thereof.

7. An optical modulator according to claim 6 including means for directing a beam of polarized light substantially parallel to the x-axis on the exposed portion of one of said opposing faces for being transmitted through said crystal.

8. An optical modulator according to claim 5 including means for modulating the said alternating electric field.

9. An optical modulator according to claim 7 wherein said beam of light is substantially monochromatic and is circularly polarized.

10. An optical modulator according to claim 9 including a linear polarizer disposed in the path of said polarized light beam after traversing said crystal.

References Cited

UNITED STATES PATENTS

| 2,064,289 | 12/1936 | Cady | 350—149 X |
| 2,467,325 | 4/1949 | Mason | 350—150 |
| 2,766,659 | 10/1956 | Baerwald | 350—150 |
| 2,788,710 | 4/1957 | West | 350—150 |
| 3,325,646 | 6/1967 | Reichel et al. | 350—157 X |

FOREIGN PATENTS 6,087   7/1927   Australia.

OTHER REFERENCES

Carpenter: "The Electro-Optic Effect in Uniaxial Crystals of the Dihydrogen Phosphate Type III Measurement of Coefficients," J.O.S.A., volume 40, pp. 225–229 (April 1950).

DAVID SCHONEBERG, *Primary Examiner.*

P. R. MILLER, *Assistant Examiner.*

U.S. Cl. X.R.

350—150, 160, 161